United States Patent
Buddhiraju et al.

(10) Patent No.: US 10,482,232 B2
(45) Date of Patent: Nov. 19, 2019

(54) ROBOTIC PROCESS AUTOMATION USING CONTROLLER EXECUTION MODEL

(71) Applicant: Bank of America Corporation, Charlotte, NC (US)

(72) Inventors: Nagaraju Buddhiraju, Moorpark, CA (US); Nye Walter Allen, IV, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 15/679,013

(22) Filed: Aug. 16, 2017

(65) Prior Publication Data
US 2019/0057203 A1 Feb. 21, 2019

(51) Int. Cl.
| G06F 21/30 | (2013.01) |
| G06F 21/60 | (2013.01) |
| G06F 21/33 | (2013.01) |
| G06F 21/10 | (2013.01) |
| G06F 9/455 | (2018.01) |

(52) U.S. Cl.
CPC .............. *G06F 21/33* (2013.01); *G06F 9/455* (2013.01); *G06F 21/10* (2013.01); *G06F 21/305* (2013.01); *G06F 21/602* (2013.01)

(58) Field of Classification Search
None
See application file for complete search history.

(56) References Cited

U.S. PATENT DOCUMENTS

| 4,727,494 A | 2/1988 | Buote |
| 5,737,498 A | 4/1998 | Murray |
| 6,138,150 A | 10/2000 | Nichols et al. |
| 6,497,566 B2 | 12/2002 | Dahl et al. |
| 7,793,154 B2 | 9/2010 | Chagoly et al. |
| 8,567,880 B2 | 10/2013 | Treat et al. |

(Continued)

FOREIGN PATENT DOCUMENTS

| EP | 550418 A2 | 7/1993 |
| EP | 1166219 A1 | 1/2002 |

(Continued)

*Primary Examiner* — Joseph P Hirl
*Assistant Examiner* — Hassan Saadoun
(74) *Attorney, Agent, or Firm* — Michael A. Springs; Moore & Van Allen PLLC; Anup Shrinivasan Iyer (57) ABSTRACT

Systems, computer program products, and methods are described herein for implementing a robotic process automation using controller execution model. The present invention is configured to receive electronically, from a user computing device, a request to establish a communication link with a hosted virtual desktop (HVD) bot; determine a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub; receive one or more authentication credentials associated with the CHVD from an encrypted credential repository; validate the one or more authentication credentials associated with the CHVD, wherein validating further comprises authorizing the user computing device to access to the CHVD hub; and establish a communication link between the user computing device and the HVD bot, via the CHVD.

17 Claims, 3 Drawing Sheets

(56) References Cited

U.S. PATENT DOCUMENTS

| | | |
|---|---|---|
| 8,965,561 B2 | 2/2015 | Jacobus et al. |
| 9,135,714 B1 | 9/2015 | Gauf et al. |
| 9,195,233 B2 | 11/2015 | Perrone |
| 9,555,544 B2 | 1/2017 | Bataller et al. |
| 2005/0086285 A1* | 4/2005 | Balasubramanian ............... G06F 9/5038 709/200 |
| 2009/0016853 A1 | 1/2009 | Yoo |
| 2010/0251141 A1* | 9/2010 | Sabin ................ G06F 16/958 715/758 |
| 2011/0209064 A1* | 8/2011 | Jorgensen ............ G06F 9/54 715/733 |
| 2017/0052824 A1 | 2/2017 | Sharma et al. |
| 2017/0173784 A1 | 6/2017 | Shah et al. |
| 2017/0228119 A1 | 8/2017 | Hosbettu et al. |

FOREIGN PATENT DOCUMENTS

| | | |
|---|---|---|
| EP | 3112965 A1 | 1/2017 |
| EP | 3133539 A1 | 2/2017 |
| EP | 3206170 A1 | 8/2017 |
| EP | 3215900 A1 | 9/2017 |

\* cited by examiner

ROBOTIC PROCESS AUTOMATION USING CONTROLLER EXECUTION MODEL

FIELD OF THE INVENTION

The present invention embraces a system, a method and a product in the context of robotic process automation (RPA).

BACKGROUND

Entities are beginning to integrate robotic process automation (RPA) together with cognitive technologies such as speech recognition, natural language processing, and machine learning to automate perpetual and judgement-based tasks. This integration of cognitive technologies and RPA is extending automation to new areas and can help companies become more efficient and agile as they move down the path of becoming fully digital.

However, the execution of robotic process automation requires maintaining active connections while preventing unauthorized access to the hosted virtual desktop (HVD) bot. Therefore, there is a need for a system to implement robotic process automation using a controller execution model.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system, method, and computer program product for implementing robotic process automation using a controller execution model is presented. The system comprising at least one non-transitory memory device with computer-readable code stored thereon; at least one processing device; and at least one module stored in said memory device and comprising instruction code that is executable by the at least one processing device and configured to cause said at least one processing device to: receive electronically, from a user computing device, a request to establish a communication link with a hosted virtual desktop (HVD) bot; determine a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub; receive one or more authentication credentials associated with the CHVD from an encrypted credential repository; validate the one or more authentication credentials associated with the CHVD, wherein validating further comprises authorizing the user computing device to access to the CHVD hub; and establish a communication link between the user computing device and the HVD bot, via the CHVD.

In some embodiments, the module is further configured to: receive electronically, from the user computing device, a request to access a first HVD bot via the CHVD hub; establish a first communication link between the first HVD bot and the user computing device; receive electronically, from the user computing device, a request to access a second HVD bot via the CHVD hub; establish a second communication link between the second HVD bot and the user computing device, wherein establishing the second communication link further comprises severing the first communication link with the first HVD bot and establishing the second communication link with the second HVD bot.

In some embodiments, the CHVD is configured to maintain an active connection with the one or more HVD bots.

In some embodiments, the module is further configured to establish a hosted virtual desktop (HVD) ring, wherein establishing further comprises: establishing a communication link with one or more HVD bots, wherein establishing further comprises severing a direct communication link between the one or more HVD bots and the user computing system; coupling a CHVD hub to the one or more HVD bots; and reconnecting the user computing system to the CHVD hub, wherein reconnecting further comprises establishing a communication link between the user computing system and the one or more HVD bots via the CHVD hub.

In some embodiments, the module is further configured to establish the communication link with the one or more HVD bots, wherein establishing further comprises: receiving one or more authentication credentials associated with the one or more HVD bots; validating the one or more authentication credentials for each of the one or more HVD bots; authenticating the CHVD hub to access each of the one or more HVD bots based on at least validating the one or more authentication credentials;

In some embodiments, the module is further configured to: assign one or more processes for execution to each of the one or more HVD bots, wherein assigning further comprises creating an active connection between the one or more processes and each of the one or more HVD bots.

In some embodiments, the module is further configured to: periodically receive an indication that the active connection between the one or more processes and each of the one or more HVD bots is still active.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Figure 1:
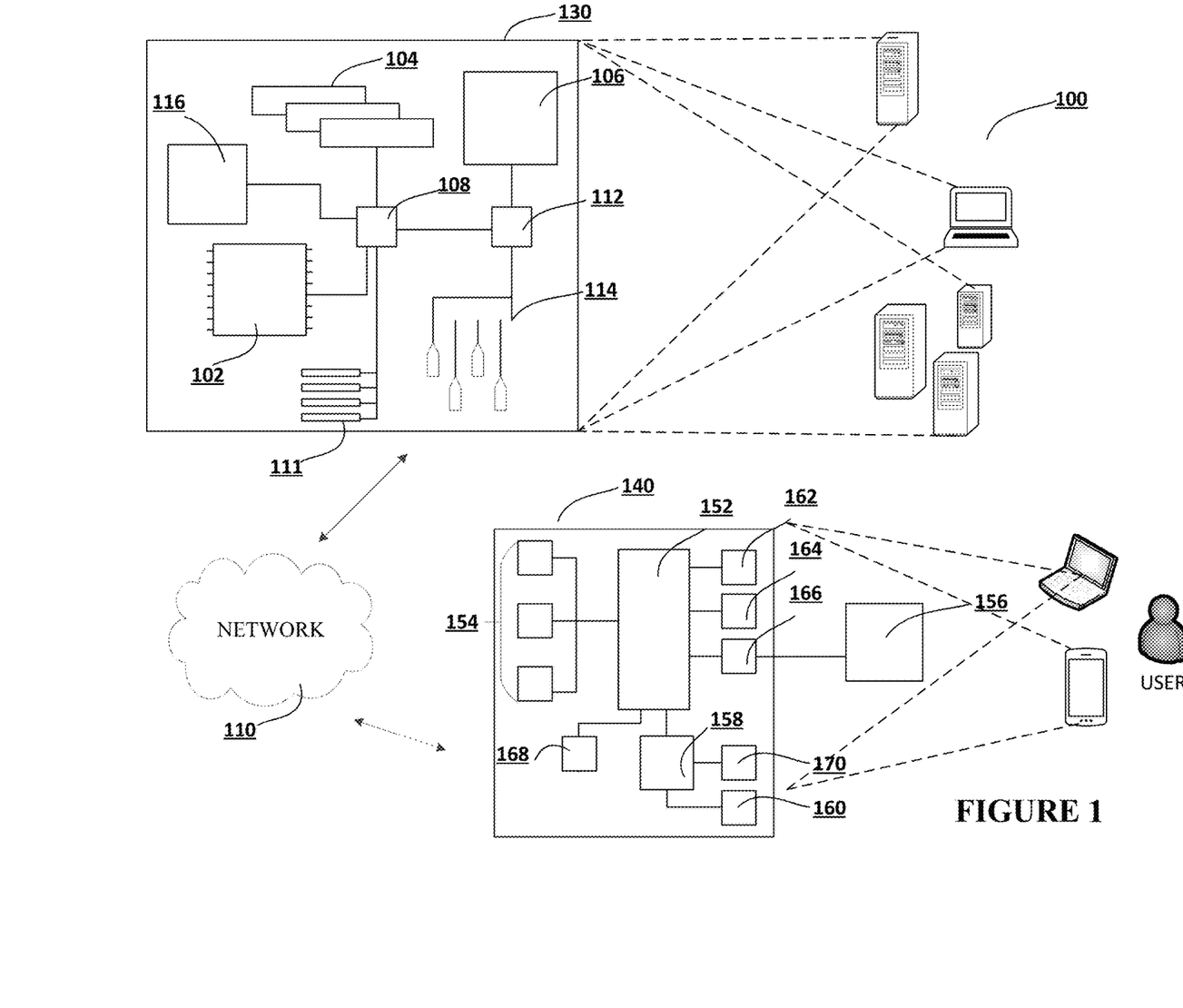
FIG. 1 illustrates technical components of a system for implementing robotic process automation using controller execution model, in accordance with an embodiment of the invention.

FIG. 1 presents an exemplary block diagram of the system environment for implementation of a robotic process automation using controller execution model. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, dynamic RAM (DRAM) card interface or a Synchronous DRAM (SDRAM) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the RAM, DRAM, or the SDRAM card interfaces, along with additional information, such as placing identifying information on the RAM, DRAM, or the SDRAM card interfaces card in a secure. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) monitor, an LCD (liquid crystal display) monitor, an LED (light emitting diode) monitor, or the like) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In Robotic Process Automation (RPA), a computer system or robot may mimic the actions of a human being in order to perform a computer-based task. In other words, RPA can be used to interact with application software (or application, for short) through its user interface, as a human being would do. Therefore it is not necessary to integrate RPA with the existing applications at a programming level, thereby eliminating the difficulties inherent to integration, namely bringing together diverse components. In this way, RPA can be used to automate the execution of repetitive and manually intensive activities. RPA's potential benefits are manifold. They can include reducing costs (by cutting staff), lowering error rates, improving service, reducing turnaround time, increasing the scalability of operations, and improving compliance.

In some embodiments, a hosted virtual desktop (HVD) may be a user interface that connects to applications and data that are stored on a cloud provider's servers rather than on the user's computer or an entity's network. Each HVD instance exists as a virtual machine on the service provider's servers. To the end users, the experience is typically indistinguishable from one in which all their data and applications are local. An HVD provides a significant advantage to the entity in terms of accessibility, cost savings with respect to hardware and their corresponding operating expenses, flexibility and agility for their technology environment, and the ability to support multiple devices concurrently.

In some embodiments, each HVD bot is configured to execute one or more processes, via one or more applications requiring one or more authentication credentials. In one aspect, each HVD bot may be configured to access the one or more applications based on a continuum of authentication. In some embodiments, the continuum of authentication includes zero authentication, which includes providing access to an application using no authentication credentials. In some other embodiments, the continuum of authentication includes hard authentication, which includes providing access to an application using full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum.

In some instances, execution of the one or more processes using hosted virtual desktops (HVDs) require the HVDs to maintain an active connection with each application throughout the execution of the process. HVD bots are typically configured to disable network connectivity and enter a stand-by mode, when they remain idle for too long. However, this setting logs off the HVD bot and in some instances, severs the HVD bot's connection to one or more processes and/or the local area network, thereby disrupting functionality. To bring the HVD bot back online, the user may have to log into each HVD bot to bring the HVD bot back online. In this regard, each user typically uses a personal access credential to access each HVD bot that is executing robotic processes on applications which require a higher level of access. This poses several challenges. First, if there are tens/hundreds of robotic instances running, managing each bot in the technology environment may become tedious and time consuming. Second, with each user using their own personal access credential to access each HVD bot, the HVD bots may be unprotected from security exposures.

The present invention provides the functional benefit of introducing a controller hosted virtual desktop (CHVD) that would span active connections to each HVD bot and keep the connection active at all times. Using this model, each user must access the CHVD, which provides a single point of entry to each HVD bot. In this way, each access can be traced back to a user. For purposes of the invention, the controller execution model, as described, is applied to HVD bots and CHVD hubs. However, a similar model may be applicable to an infrastructure comprising physical desktops, servers, and/or a combination of HVD bots, physical desktops, and servers.

Figure 2:
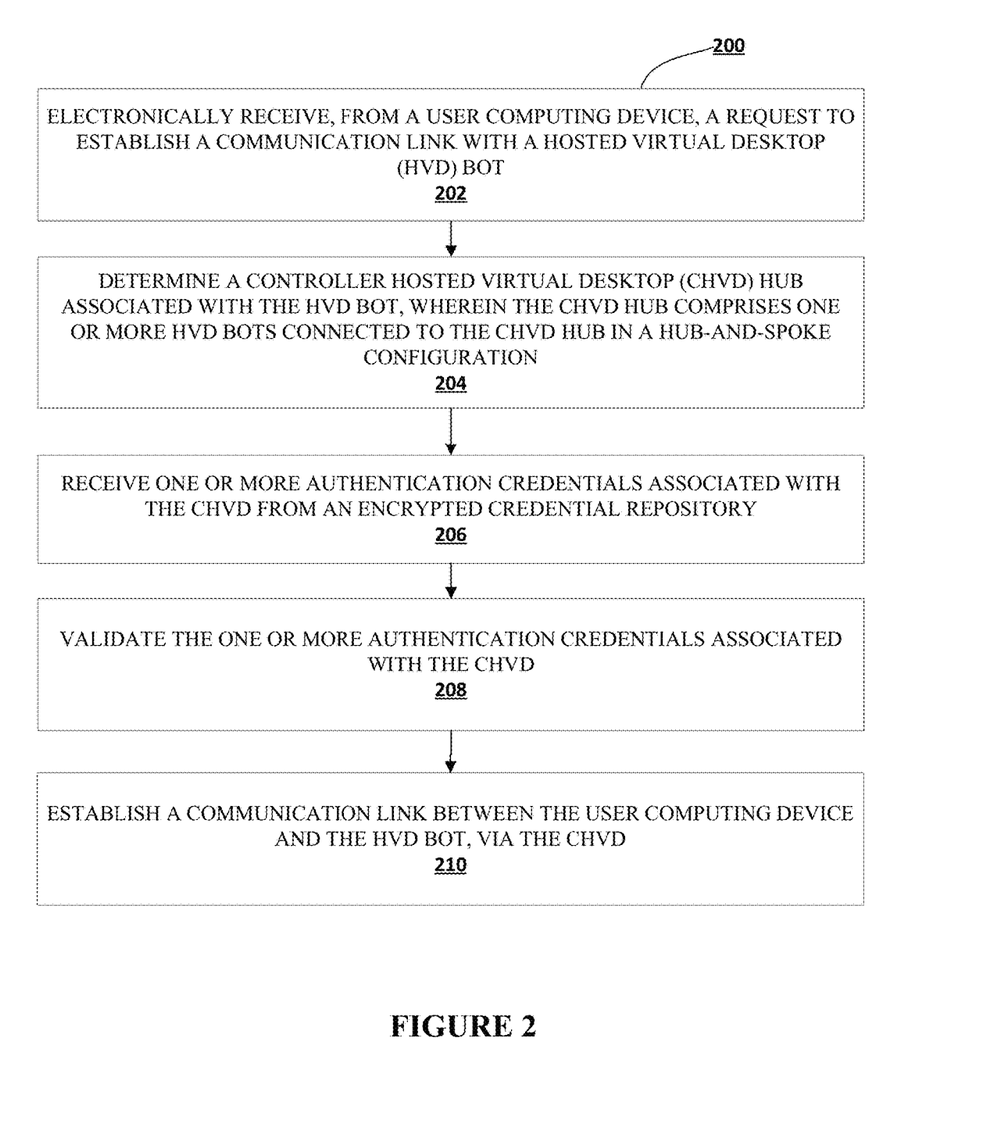
FIG. 2 illustrates a process flow for implementing a robotic process automation using a controller execution model, in accordance with an embodiment of the invention.

FIG. 2 illustrates a process flow for implementing a robotic process automation using a controller execution model 100, in accordance with an embodiment of the invention. As shown in block 202, the process flow includes receiving electronically, from a user computing device, a request to establish a communication link with a hosted virtual desktop (HVD) bot. Next, as shown in block 204, the process flow includes determining a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub, thereby establishing a hosted virtual desktop (HVD) ring. In this regard, the system may be configured to establish a communication link with one or more HVD bots. In doing so, the system severs a direct communication link between the one or more HVD bots and the user computing system. In one aspect, this implies denying the user computing device direct access to the HVD bot.

In response, the system may be configured to couple a CHVD hub to the one or more HVD bots. In this regard, the system may be configured to establish the communication link with the one or more HVD bots. This is achieved by configuring the system to receive one or more authentication credentials associated with the one or more HVD bots. In one aspect, the one or more authentication credentials associated with the one or more HVD bots may be stored in an repository or vault. In response, the authentication credentials may be validated for each of the one or more HVD bots. Once validated, the CHVD hub may be provided access to each of the one or more HVD bots. In response to providing the CHVD hub access to the one or more HVD bots, the system may be configured to reconnect the user computing system to the CHVD hub. In this regard, the system may be configured to establish a communication link between the user computing system and the one or more HVD bots via the CHVD hub. In this way, the CHVD is configured to maintain an active connection with the one or more HVD bots. For example, the authentication credentials for the one or more HVD bots may include, but is not limited to a username, a password, an IP address associated with the HVD bot, biometrics associated with the user authorizing the HVD ring, or the like.

Next, as shown in block 206, the process flow includes receiving one or more authentication credentials associated with the CHVD hub from an encrypted credential repository or vault. In some embodiments, receiving the authentication credentials for the CHVD hub may require user authentication. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In this regard, the system may be configured to prompt the user to enter authentication credentials to access the encrypted credential repository or vault. In some embodiments, once the user is authorized to access the encrypted credential repository or vault, the system may be configured to retrieve the authentication credentials for the CHVD hub and automatically provide the user with access to the CHVD hub. In one aspect, the authentication credentials for the CHVD hub may include an IP address associated with the CHVD hub. In some other embodiments, once the user is authorized to access the encrypted credential repository or vault, the system may be configured to provide the user with the authentication credentials to the CHVD hub. In response, the system may be configured to receive the authentication credentials for the CHVD hub from the user, via a manual input, and provide the user with access to the CHVD hub.

In some embodiments, the authentication credentials associated with the CHVD hub and the authentication credentials associated with the one or more HVD bots may be stored in the same repository. In this regard, the system may be configured to provide user access to the repository based on authentication credentials associated with the user. In one aspect, the level of authentication required to access the authentication credentials associated with the HVD bot may be the same as the level of authentication required to access the authentication credentials associated with the CHVD hub. In another aspect, the level of authentication required to access the authentication credentials associated with the HVD bot may be different from the level of authentication required to access the authentication credentials associated with the CHVD hub. In some other embodiments, the authentication credentials associated with the CHVD hub and the authentication credentials associated with the one or more HVD bots may be stored in different repositories.

Next, as shown in block 208, the process flow includes validating the one or more authentication credentials associated with the CHVD hub, wherein validating further comprises authorizing the user computing device to access to the CHVD hub. In one aspect, once the authentication credentials for the CHVD hub are retrieved from the encrypted credential repository or vault, the system may be configured to lock or "check-out" the authentication credentials such that no other user may access the CHVD hub at the same time. In some embodiments, once the authentication credentials for the CHVD hub has been used, or checked back in, the system may be configured to update the credentials for the CHVD hub with new authentication credentials such that the same authentication credentials cannot be used to access the CHVD hub more than once. In some other embodiments, the system may be configured to periodically update the authentication credentials required to access the CHVD hub in the encrypted credential repository or vault. In one aspect, the system may be configured to not require addition authentication credentials from the user to access each HVD bot once the CHVD hub has been accessed by the user. In another aspect, in addition to requiring authentication credentials to access the CHVD hub, the system may be configured to require additional authentication from the user to access each HVD bot.

In some embodiments, the system may be configured to receive a request from the user computing device to access a second CHVD hub (or one or more HVD bots connected to the second CHVD hub) while being connected to a first CHVD hub. In such instances, the system may be configured to first sever the connection between the user computing system and the first CHVD hub and then establish a communication link with the second CHVD hub.

Next, as shown in block 210, the process flow includes establishing a communication link between the user computing device and the HVD bot, via the CHVD. In some embodiments, the system may be configured to receive electronically, from the user computing device, a request to access a first HVD bot via the CHVD hub. In response, the system may establish a first communication link between the first HVD bot and the user computing device, via the CHVD hub. Once established, the user computing device may be provided access to the one or more applications the first HVD bot is configured to execute. In some embodiments, the system may then receive electronically, from the user computing device, a request to access a second HVD bot via the CHVD hub. In such instances, the system may be configured to sever the first communication link between the user computing device and the first HVD bot before establishing a second communication link between the second HVD bot and the user computing device, via CHVD hub. In another embodiment, the system may be configured to enable the user to access both the first HVD bot and the second HVD bot concurrently. In some embodiments, any attempted access by a user to access the CHVD hub and/or the HVD bot using authentication credentials other than the ones stored in the encrypted credential repository or vault may result in the termination of the active session of the CHVD hub and/or the HVD being accessed. In this way, despite access levels of the user, the present invention provides the functional benefit of enabling access only via authentication credentials stored in the encrypted credential repository or vault. In this way, the system may be configured to provide traceability and track usage.

Figure 3:
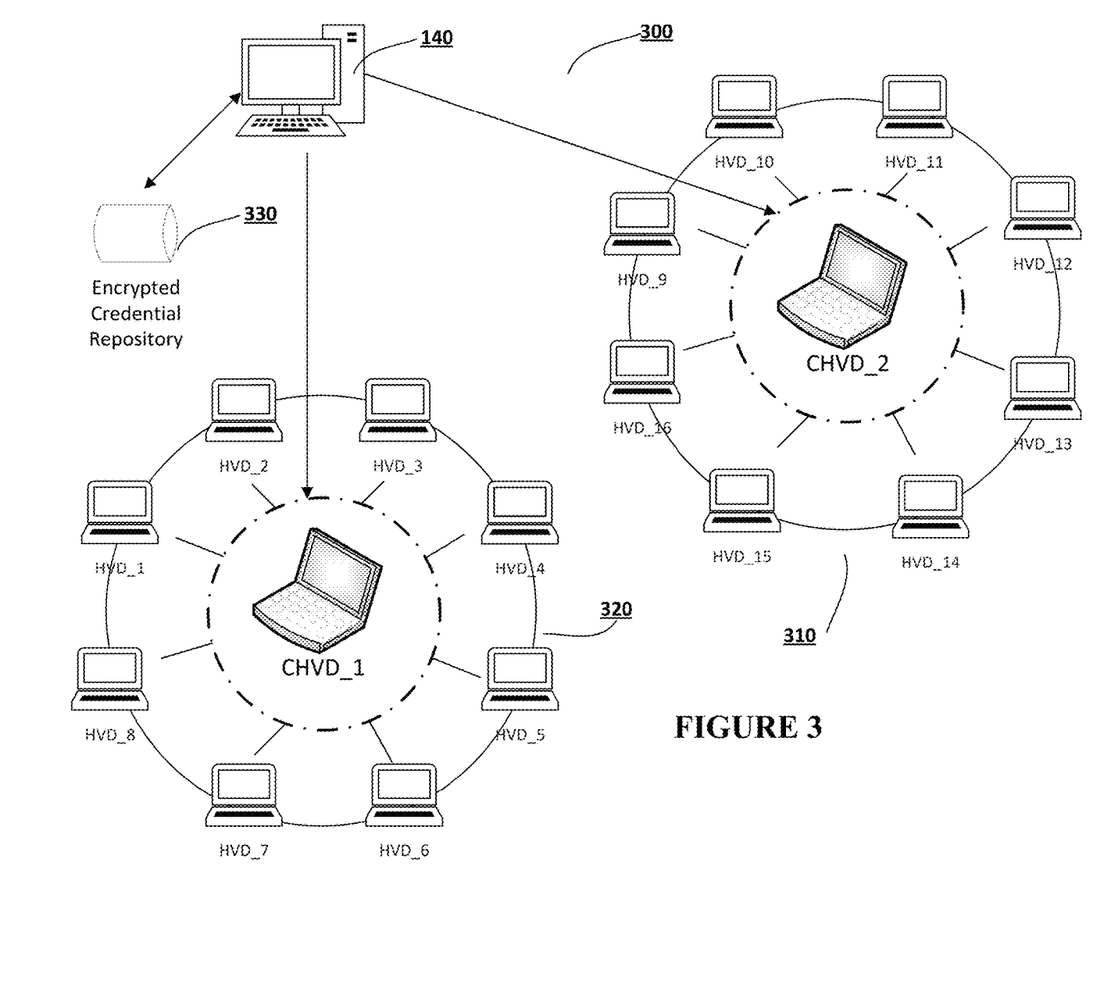
FIG. 3 illustrates an exemplary controller model, in accordance with embodiments of the invention.

FIG. 3 illustrates an exemplary controller model 300, in accordance with embodiments of the invention. As shown in FIG. 3, the controller model includes user computing device 140, CHVD_1 hub 320 operatively connected to one or more HVD bots (e.g., HVD_1, HVD_2 . . . HVD_8), CHVD_2 hub 310 operatively connected to one or more HVD bots (e.g., HVD_9, HVD_10 . . . HVD_16), and an encrypted credential repository or vault 330. Each connection established between the user computing device 140 and a CHVD hub (CHVD_1 320 or CHVD_2 310), are established via a robotic desktop protocol (RDP) connection. Further, each HVD bot connected to a CHVD hub is connected via an active RDP connection.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing robotic process automation using a controller execution model, the system comprising:
    at least one non-transitory memory device with computer-readable code stored thereon;
    at least one processing device; and
    at least one module stored in said memory device and comprising instruction code that is executable by the at least one processing device and configured to cause said at least one processing device to:
        receive electronically, from a user computing device, a request to establish a communication link with a hosted virtual desktop (HVD) bot;
        determine a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub;
        receive one or more authentication credentials associated with the CHVD from an encrypted credential repository;
        validate the one or more authentication credentials associated with the CHVD, wherein validating further comprises authorizing the user computing device to access to the CHVD hub;
        establish a communication link between the user computing device and the HVD bot, via the CHVD;
        receive electronically, from the user computing device, a request to access a first HVD bot via the CHVD hub;
        establish a first communication link between the first HVD bot and the user computing device;
        receive electronically, from the user computing device, a request to access a second HVD bot via the CHVD hub;
        establish a second communication link between the second HVD bot and the user computing device, wherein establishing the second communication link further comprises severing the first communication link with the first HVD bot and establishing the second communication link with the second HVD bot.

2. The system of claim 1, wherein the CHVD hub is configured to maintain an active connection with the one or more HVD bots.

3. The system of claim 1, wherein the module is further configured to establish a hosted virtual desktop (HVD) ring, wherein establishing further comprises:
    establishing a communication link with one or more HVD bots, wherein establishing further comprises severing a direct communication link between the one or more HVD bots and a user computing system;
    coupling a CHVD hub to the one or more HVD bots; and reconnecting the user computing system to the CHVD hub, wherein reconnecting further comprises establishing a communication link between the user computing system and the one or more HVD bots via the CHVD hub.

4. The system of claim 3, wherein the module is further configured to establish the communication link with the one or more HVD bots, wherein establishing further comprises:
receiving one or more authentication credentials associated with the one or more HVD bots;
validating the one or more authentication credentials for each of the one or more HVD bots; and
authenticating the CHVD hub to access each of the one or more HVD bots based on at least validating the one or more authentication credentials.

5. The system of claim 4, wherein the module is further configured to:
assign one or more processes for execution to each of the one or more HVD bots, wherein assigning further comprises creating an active connection between the one or more processes and each of the one or more HVD bots.

6. The system of claim 5, wherein the module is further configured to:
periodically receive an indication that the active connection between the one or more processes and each of the one or more HVD bots is still active.

7. A computerized method for implementing robotic process automation using a controller execution model, the method comprising:
receiving electronically, from a user computing device, a request to establish a communication link with a hosted virtual desktop (HVD) bot;
determining, using a computing device processor, a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub;
receiving, using a computing device processor, one or more authentication credentials associated with the CHVD from an encrypted credential repository;
validating, using a computing device processor, the one or more authentication credentials associated with the CHVD, wherein validating further comprises authorizing the user computing device to access to the CHVD hub;
establishing, using a computing device processor, a communication link between the user computing device and the HVD bot, via the CHVD;
receive electronically, from the user computing device, a request to access a first HVD bot via the CHVD hub;
establish a first communication link between the first HVD bot and the user computing device;
receive electronically, from the user computing device, a request to access a second HVD bot via the CHVD hub;
establish a second communication link between the second HVD bot and the user computing device, wherein establishing the second communication link further comprises severing the first communication link with the first HVD bot and establishing the second communication link with the second HVD bot.

8. The method of claim 7, wherein the CHVD hub is configured to maintain an active connection with the one or more HVD bots.

9. The method of claim 7, wherein the method further comprises establishing a hosted virtual desktop (HVD) ring, wherein establishing further comprises:
establishing a communication link with one or more HVD bots, wherein establishing further comprises severing a direct communication link between the one or more HVD bots and a user computing system;
coupling a CHVD hub to the one or more HVD bots; and
reconnecting the user computing system to the CHVD hub, wherein reconnecting further comprises establishing a communication link between the user computing system and the one or more HVD bots via the CHVD hub.

10. The method of claim 9, wherein the method further comprises establishing the communication link with the one or more HVD bots, wherein establishing further comprises:
receiving one or more authentication credentials associated with the one or more HVD bots;
validating the one or more authentication credentials for each of the one or more HVD bots; and
authenticating the CHVD hub to access each of the one or more HVD bots based on at least validating the one or more authentication credentials.

11. The method of claim 10, wherein the method further comprises:
assigning one or more processes for execution to each of the one or more HVD bots, wherein assigning further comprises creating an active connection between the one or more processes and each of the one or more HVD bots.

12. The method of claim 11, wherein the method further comprises:
periodically receiving an indication that the active connection between the one or more processes and each of the one or more HVD bots is still active.

13. A computer program product for implementing robotic process automation using a controller execution model, the computer program product comprising a non-transitory computer-readable medium comprising code causing a first apparatus to:
receive electronically, from a user computing device, a request to establish a communication link with a hosted virtual desktop (HVD) bot;
determine a controller hosted virtual desktop (CHVD) hub associated with the HVD bot, wherein the CHVD hub comprises one or more HVD bots connected to the CHVD hub in a hub-and-spoke configuration, wherein the HVD bot is accessible only via the CHVD hub;
receive one or more authentication credentials associated with the CHVD from an encrypted credential repository;
validate the one or more authentication credentials associated with the CHVD, wherein validating further comprises authorizing the user computing device to access to the CHVD hub;
establish a communication link between the user computing device and the HVD bot, via the CHVD;
receive electronically, from the user computing device, a request to access a first HVD bot via the CHVD hub;
establish a first communication link between the first HVD bot and the user computing device;
receive electronically, from the user computing device, a request to access a second HVD bot via the CHVD hub;
establish a second communication link between the second HVD bot and the user computing device, wherein establishing the second communication link further comprises severing the first communication link with the first HVD bot and establishing the second communication link with the second HVD bot.

14. The computer program product of claim 13, wherein the CHVD hub is configured to maintain an active connection with the one or more HVD bots.

15. The computer program product of claim 13, wherein the first apparatus is further configured to establish a hosted virtual desktop (HVD) ring, wherein establishing further comprises:
  establishing a communication link with one or more HVD bots, wherein establishing further comprises severing a direct communication link between the one or more HVD bots and a user computing system;
  coupling a CHVD hub to the one or more HVD bots; and
  reconnecting the user computing system to the CHVD hub, wherein reconnecting further comprises establishing a communication link between the user computing system and the one or more HVD bots via the CHVD hub.

16. The computer program product of claim 15, wherein the first apparatus is further configured to establish the communication link with the one or more HVD bots, wherein establishing further comprises:
  receiving one or more authentication credentials associated with the one or more HVD bots;
  validating the one or more authentication credentials for each of the one or more HVD bots; and
  authenticating the CHVD hub to access each of the one or more HVD bots based on at least validating the one or more authentication credentials.

17. The computer program product of claim 16, wherein the first apparatus is further configured to:
  assigning one or more processes for execution to each of the one or more HVD bots, wherein assigning further comprises creating an active connection between the one or more processes and each of the one or more HVD bots.

* * * * *